United States Patent [19]

Ridenour

[11] 3,977,710

[45] Aug. 31, 1976

[54] TUBE FITTING ASSEMBLY
[75] Inventor: Ralph G. Ridenour, Mansfield, Ohio
[73] Assignee: Universal Refrigeration Inc., Mansfield, Ohio
[22] Filed: Mar. 3, 1975
[21] Appl. No.: 554,395

Related U.S. Application Data
[63] Continuation-in-part of Ser. No. 425,561, Dec. 17, 1973, abandoned.

[52] U.S. Cl. .............................. 285/382.5; 29/523; 285/382.7
[51] Int. Cl.² ........................................ F16L 13/14
[58] Field of Search ............ 285/382.5, 382.4, 354, 285/382.7; 29/520, 522, 523, 509

[56] References Cited
UNITED STATES PATENTS

| 1,817,854 | 8/1931 | Sorensen | 285/382.5 X |
| 2,477,676 | 8/1949 | Woodling | 285/382.5 X |
| 2,685,461 | 8/1954 | Mueller | 285/382.5 X |
| 3,092,404 | 6/1963 | MacWilliam | 285/354 X |
| 3,270,793 | 9/1966 | Polmon | 29/522 X |
| 3,497,946 | 3/1970 | Tingley | 285/382.5 X |
| 3,778,090 | 12/1973 | Tobin | 285/382.5 X |
| 3,817,562 | 6/1974 | Cook et al. | 285/382.5 X |

Primary Examiner—Thomas F. Callaghan
Attorney, Agent, or Firm—Woodling, Krost, Granger & Rust

[57] ABSTRACT

A tube fitting assembly is disclosed comprising a fitting having a first bore through a portion of the fitting and a second bore larger than the first bore and concentric with and through a portion of the first bore. A tubing having a diameter substantially equal to the first bore engages an inside surface of the fitting defined by the end of the first bore. A sleeve having an outwardly extending projection receives the tubing with the projection located within the second bore. Relative movement between the fitting and the tubing radially expands the tubing wall to engage the first and second bores and deforms the sleeve projection outwardly from the tubing to engage the second bore by action of the radial expansion of the tubing wall. The foregoing is merely a resume of one general application, is not a complete discussion of all principles of operation or applications and is not to be construed as a limitation on the scope of the claimed subject matter.

11 Claims, 6 Drawing Figures

3,977,710

TUBE FITTING ASSEMBLY

CROSS-REFERENCE TO RELATED APPLICATIONS

This is a continuation-in-part of my prior application Ser. No. 425,561 filed Dec. 17, 1973 and now abandoned.

BACKGROUND OF THE INVENTION

1. Field of the Invention

This invention relates to pipes and tubular conduits and to metalworking and more particularly to a mechanical process by flaring an inserted tube end or expanding a part in an aperture or radial expanding an internal fitting tube.

2. Description of the Prior Art

The prior art of metal working has known many types of tube and fitting assemblies wherein a tube and fitting are joined without the aid of threads, nut, and the like. Generally, the tube or fitting is deformed or swaged to seal the tube so the fitting.

In many cases, the swaging or deformation process causes a cold welding of the tube and fitting due to the extremely high pressures exerted between the tube and fitting. Cold welding was generally accomplished on softer materials such as aluminum and the like. One disadvantage of cold welding is that the weld takes place only when the materials were freshly cut or prepared. If aluminum parts were stored for any substantial period of time, then no cold weld would form due to aluminum oxide on the surfaces.

The prior art has joined tube and fittings assemblies by inserting a tube into a fitting and using a flaring tool to expand the tubing wall to engage the fitting. For example, a fitting bore may have a recess wherein the tubing wall is radially expanded by a flaring tool to engage the bore recess to form a seal between the tube and the fitting. This process was suitable only for larger tubes and did not provide a high pressure seal.

The prior art has used a ring stake process to join a small tube to a fitting. The ring stake process incorporates a fitting having a single bore substantially the same diameter as the tube. The tube is inserted into the bore and a die swages an outside surface of the fitting surrounding the bore to cause a deformation of the fitting to engage the tubing wall. This process did not require any internal flaring tool and provided a seal satisfactory at low-pressure so long as no torsional strain was applied between the tube and the fitting. However, the seal could be destroyed if a torque was applied between the tube and the fitting about the axis of the tube. Consequently, the ring stake tube fitting assembly proved unreliable for many applications.

In my prior applications, Ser. No. 425,561 filed Dec. 17, 1973 and the divisional application thereof, I disclose a Method and Apparatus which overcame these disadvantages. However, my prior Method and Apparatus was more adaptable for use with small tubing.

Therefore, an object of this invention is to provide a tube fitting assembly and method of making thereof which requires no cold welding.

Another object of this invention is to provide a tube fitting assembly and method of making thereof which requires no internal flaring tools.

Another object of this invention is to provide a tube fitting assembly and method of making thereof which can be formed in a one-step operation.

Another object of this invention is to provide a tube fitting assembly and method of making thereof which has a high torsional strength.

Another object of this invention is to provide a tube fitting assembly and method of making thereof which is able to withstand vibration.

Another object of this invention is to provide a tube fitting assembly and method of making thereof which incorporates a sleeve for added strength.

Another object of this invention is to provide a tube fitting assembly and method of making thereof which is capable of high pressure sealing.

Another object of this invention is to provide a tube fitting assembly and method of making thereof which is reliable.

SUMMARY OF THE INVENTION

The invention may be incorporated in a tube fitting assembly comprising in combination: a fitting having a first orifice through at least a portion of said fitting, said fitting having a second orifice through a portion of said first orifice; a tubing occupying said first and second orifices and having a deformed portion of the tubing wall engaging said first and second orifices, and a restraining member mounted to said tubing for mutually engaging the outer surface of said tubing and an inner surface of said fitting.

The invention may also be incorporated into a method of forming an assembly of a tubing and a restraint member and a fitting wherein the fitting has a first orifice through a portion of the fitting and a second orifice through a portion of the first orifice, comprising the steps of: holding the fitting; holding the tubing and the restraint member to prevent relative movement therebetween; inserting the tubing into the first orifice; and relatively axially moving the fitting and the tubing and restraint member to radially expand a portion of the tubing into one of the orifices and to radially expand the restraint member into engagement with said one of the orifices by the expansion of the tubing.

Other objects and a fuller understanding of the invention may be had by referring to the following description and claims, taken in conjunction with the accompanying drawings.

DESCRIPTION OF THE PREFERRED EMBODIMENT

Figure 1:
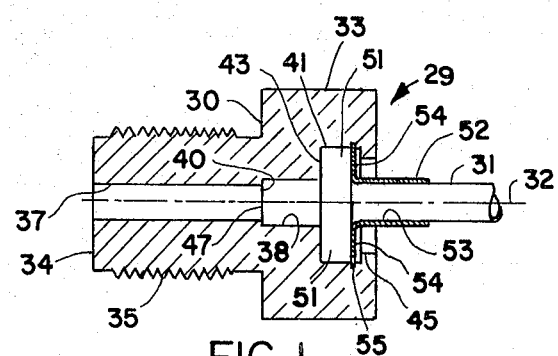
FIG. 1 is a longitudinal sectional view of a novel tube fitting assembly and which is the preferred embodiment.

FIG. 1 is a longitudinal sectional view of the tube fitting invention. The assembly 29 comprises a fitting 30 and a tubing 31. The fitting 30 has a body 33 shown as a cylinder and a cylindrical tip 34 coaxial with axis 32. The tip 34 has mounting threads, for example, male threads 35, and a coaxial aperture 37. The body 33 has a first coaxial bore 38 extending through a portion of the fitting 30. The bore 38 defines an internal or inner surface 40 of the fitting 30 at the end of the bore. A second coaxial bore 41 extends through a portion of the first bore 38. A first shoulder 43 is formed at the junction of the first and second bores 38 and 41. A collar 45 adds mechanical strength to the end of the fitting body 33.

The tubing 31 is substantially equal in diameter to the bore 38 and engages the first bore 38 with a tubing end 47 contacting the internal surface 40 of the fitting. A sleeve 52 having a central aperture 53 is mounted on the tubing 31 and extends into the second bore 41. The sleeve 52 has a projection 54 which extends uniformally around the sleeve 52. A toothed edge 55 at the end of the projection 54 engages the second bore 41 and extends into the body 33 of the fitting 30. The tubing wall has a deformed portion 51 wherein the tubing wall is radially expanded about the axis 32 of the tube to engage the first shoulder 43 and the region between the first and second bores 38 and 41. The deformed portion 51 also engages the second bore 41 to completely fill the space between the shoulder 43 and the projection 54 of sleeve 52. The radially expanded portion 51 of the tubing 31 is locked between the shoulder 43 and the projection 54.

Figure 2:
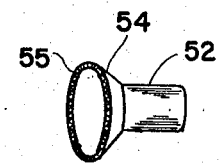
FIG. 2 is an isometric view of a sleeve shown in FIG. 1.
Figure 3:
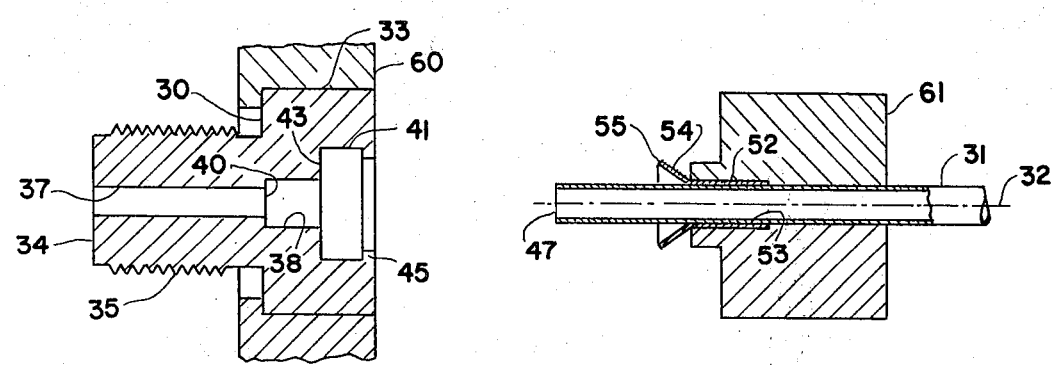
FIGS. 3–6 are views similar to FIG. 1 which illustrates a method of forming the tube fitting assembly shown in FIG. 1.

The sleeve 52 is shown in FIG. 2 and may be made of a hard material such as steel, whereas the fitting 30 and the tubing 31 may be made of a substantially ductile material such as aluminum. The toothed edge 55 of the sleeve 52 readily seats into the second bore 41 of the fitting 30 since the steel sleeve 52 is substantially harder than the aluminum fitting 30. The steel sleeve 52 may be preformed with a conically shaped projection 54 or may have a plurality of projections extending outwardly from the axis of the sleeve 52. The sleeve 52 limits the expansion of the tubing wall and projection 54 is essentially jammed between the outer surface of tubing 31 and the inner surface of the second bore 41.

In my prior patent application Ser. No. 425,561 filed Dec. 17, 1973 I disclosed a tube fitting assembly which was readily adaptable to small diameter tubings for example ⅛ inch outside diameter (O.D.) or 3.2 mm.O.D. The present invention is more suitable for larger aluminum tubing for example ⅜ inch O.D. or 9.5 mm. Consistantly tube fitting assemblies can be sealed to a pressure test of 1,000 lbs. per square inch (p.s.i.) at a temperature of 650°F. The tube fitting assembly 29 is not adversely affected by vibration making the assembly readily adaptable for high pressure connections in vehicles, such as automobile air conditioning units. The present invention has the rotational strength which was exhibited in my prior application Ser. No. 425,561 filed Dec. 17, 1973.

For example, if the tube 31 is twisted about the tube axis 1 inch from the fitting 30, the tube 31 will break after several rotations prior to breaking the seal. The invention provides a tube fitting assembly where the seal between the tube and the fitting is stronger than the tube. The aforementioned pressure and mechanical strength of this novel tube fitting assembly is a substantial contribution to the tube fitting art. The addition of the instant invention to my prior invention, Ser. No. 425,561 filed Dec. 17, 1973 which is hereby incorporated by reference, provides the tube fitting art with high pressure seals having substantial rotational and vibrational strength which are adaptable to a variety of tubing sizes.

The invention has been set forth as a tube fitting assembly 29 comprising a fitting 30 having a first orifice shown as a bore 38 which may be tapered or curved and extending through at least a portion of the fitting. The fitting has a second orifice shown as a second bore 41 which may also be tapered or curved and through a portion of the first orifice. The assembly includes a tubing 31 occupying the first and second orifices 38 and 41 and having a deformed portion 51 of the tubing wall engaging one of the first and second orifices 38 and 41. A restraining member shown as sleeve 52 is mounted to the tubing 31 for mutually engaging one of the first and second orifices 38 and 41 and the outer surface of the tubing 31. The restraining member 52 simultaneously engages the expanded portion 51 and an outer surface of the tubing 31 adjacent the expanded portion.

In FIG. 1, the second orifice or bore 41 has a larger cross-sectional area than the first bore 38. It is apparent that the first and second orifices and tubing may have a cross-sectional shape of a polygon and need not necessarily have a circular cross-sectional shape. Likewise, the embodiment illustrates a simplified arrangement wherein the aperture 37, the first bore 38, and the second bore 41 are coaxial with one another with the tubing 31 being substantially equal in diameter to the first bore 38. These simplified modifications need not necessarily be applied to practice this invention. The deformed portions of the tubing wall need not necessarily be radially expanded but may be contracted along a tapered or curved orifice and/or an expansion about another orifice.

Figures 4, 5:
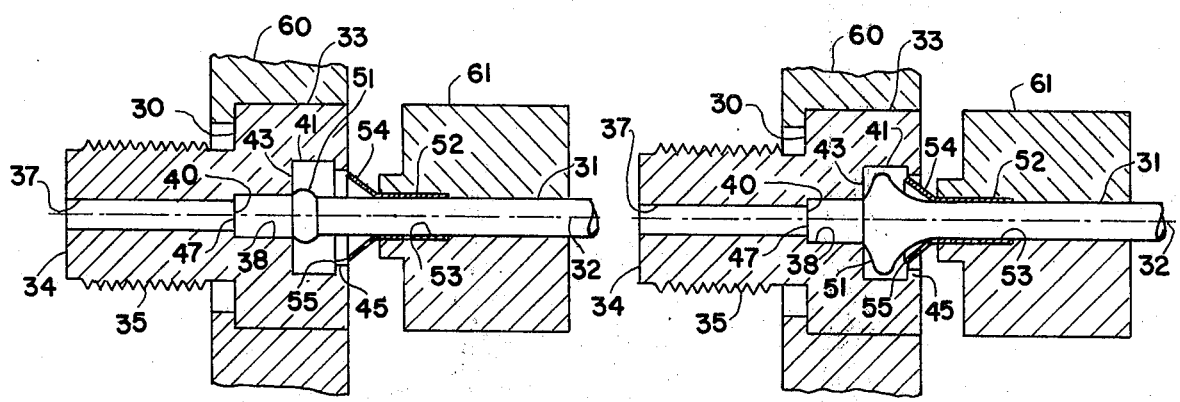

The invention illustrated in FIG. 1 also resides in the method of making the tube fitting assembly shown in FIGS. 3–6. The method of forming the tube fitting assembly requires the fitting to have a first orifice 38 through at least a portion of the fitting and a second orifice 41 through a portion of the first orifice 38. The restraint member 52, shown as a sleeve, may have a central aperture 53 for receiving the outside diameter of the tubing 31. The method of forming the assembly comprises the steps of holding the fitting by a holding die 60 and simultaneously holding the tubing 31 and the restraint member 52 by a holding die 61. The holding die 61 holds the tube 31 at a distance from the tube end 47 which is greater than the length of the first bore 38 with the tubing 31 being inserted into the aperture 53 of sleeve 52. The first bore 38 includes the distance from the outside of the fitting to the internal surface 40. This greater length is required due to the contraction of length of the tube 31 to form the enlargement 51 of the tubing wall to engage with the fitting. The method includes inserting the tubing 31 into the first orifice 38 as shown in FIG. 4 and abutting the inserted end of the tubing against the internal surface 40 of the fitting. The process requires relatively moving the held tubing 31 and the held fitting 30 to deform the tubing wall into one of the orifices 38 and 41. This step is illustrated in FIGS. 4 and 5 wherein the relative movement of the tube radially expands a portion of the tubing wall to form a bead 51 in the second bore 41 which bead will eventually contact the projection 54 of restraint member 52. Continued relative movement shown in FIG. 6 between the held tubing 31 and the held fitting 30 deforms the projection 54 of the restraint member 52 outwardly from the tubing 31 to engage the second bore 41 by the continued expansion of the tubing wall. The toothed edge 55 of the projection 54 is forced into the body 33 of the fitting at the second bore 41 by the expansion of the tubing wall. Since the fitting 30 is substantially more ductile than the sleeve 52, the toothed edge readily seats into the second bore 41 of the fitting 30. The radial expansion of the tubing wall occupies substantially all of the volume of the second bore between the shoulder 43 and the projection 54 beyond the diameter of the tubing 31. Since the tubing 31 is substantially more ductile than the sleeve member 52, the sleeve member 52 locks the radially expanded portion into the fitting 30 between the shoulder 43 and the projection 54 of the sleeve member 52. The relative movement between dies 60 and 61 causes the sleeve 52 and projection 54 to compress the bead 51 to complete the seal between the tubing and the fitting.

The novel tube fitting assembly and method of making thereof has been set forth in FIG. 1. The advancement of this invention over the prior art can best be appreciated in view of the pressure-tightness and mechanical strength of the assembly. Much of this strength is attributed from present understanding to the sleeve member 52. The assembly has a substantial increase in mechanical and pressure strength over the prior art even though requiring only a relatively small modification to the structure.

Figure 6:
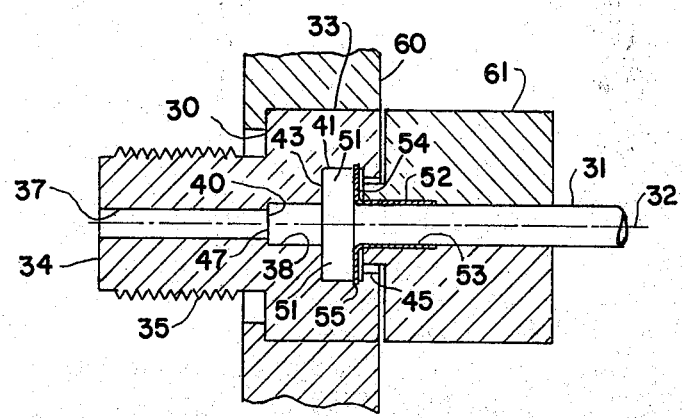

This invention has been perfected on 0.375 inch O.D.(9.5 mm.) soft aluminum tubing having a 0.035 inch (0.9 mm.) wall thickness. The first bore 38 has a diameter approximately 0.004 inch larger than the O.D. of the tubing 31. The steel sleeve 52 is generally selected to be approximately 30% longer than the diameter of the tubing 31 with the sleeve aperture 53 being 0.004 inches larger than the O.D. of the tubing 31. The projection 54 may initially form an angle of 35° to 45° with the axis of the sleeve 52 as shown in FIG. 2. After the tube fitting assembly is completed, the projection 54 is substantially perpendicular to the axis 32 of tube 31 as shown in FIGS. 1 and 6. As much as ⅜ inch of tubing extends in front of the sleeve 52 since approximately ¼ inch of tubing length is consumed during the radial expansion which requires from 0.035 to 0.045 inches radius beyond the first bore 38.

From present understanding, the radially expanded portion 51 is cold worked to be stronger but more brittle than unworked aluminum. The sleeve 52 not only aids in the compression of bead 51 but adds strength to the brittle aluminum making the tube fitting assembly suitable for use under vibrating conditions. Fittings made in accordance with the above specifications have been tested to 1,000 pounds per square inch at 650°F with no detectable leaks. Such fittings for the automobile air conditioner industry require 1,000 p.s.i. pound leak test at only 225°F.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and materials thereof may be resorted to without departing from the spirit and the scope of the invention as hereinafter claimed.

What is claimed is:

1. A tube fitting assembly comprising in combination:
   a fitting having a first surface defining a first orifice through at least a portion of said fitting;
   said fitting having a second surface defining a second orifice through a portion of said first orifice and establishing a first shoulder in proximity to the junction of said first and second orifices;
   said second orifice having a greater cross-sectional area than said first orifice;
   a tubing having an inside tubing wall surface and having an outside tubing wall surface occupying said first and second orifices and having a portion of the tubing wall engaging said first surface defining said first orifice;
   a restraining member having an internal orifice commensurate with the cross-sectional area of said outside tubing wall surface of said tubing;
   said restraining member having a radially extending projection;
   means for mounting said restraining member on said tubing with said internal orifice of said restraining member cooperating with said outside tubing wall surface of said tubing;
   a radially expanded portion of said outside tubing wall surface engaged with said second surface of said second orifice;
   and said radially extending projection of said restraining member being expanding in a radial direction into engagement with said second surface defining said second orifice an engaging said outside tubing wall surface to secure said radially expanded tubing wall between said first shoulder and said projection.

2. A tube fitting assembly as set forth in claim 1 wherein said projection of said restraining member limits axial expansion of said tubing wall.

3. A tube fitting assembly as set forth in claim 1 wherein said radially expanded portion of said tubing wall occupies substantially all of said second orifice between said first shoulder and said projection radially outwardly from said inside tubing wall surface of said tubing.

4. A tube fitting assembly as set forth in claim 1 wherein said tubing has a tubing end abutting said fitting.

5. A tube fitting assembly as set forth in claim 1 wherein said first and second orifices are located along a common line.

6. A tube fitting assembly as set forth in claim 1 wherein said restraining member includes a sleeve member for providing said internal orifice of said restraining member;
   and said projection being at least partially circular in shape and extending from said sleeve member.

7. A tube fitting assembly as set forth in claim 1 wherein said second surface defining said second orifice is deformed by said radially expanded projection of said restraining member to lock said restraining member relative to said fitting.

8. A tube fitting assembly as set forth in claim 1 wherein said projection of said restraining member includes a toothed edge.

9. A tube fitting assembly as set forth in claim 1 wherein said radially expanded tubing wall seals with said second surface defining said second orifice;
   and said tubing wall has an axially expanded tubing wall portion to seal said tubing to said fitting between said first shoulder and said projection.

10. A tube fitting assembly as set forth in claim 1 wherein the material of said fitting is more ductile than the material of said restraining member and is deformed at said second surface defining said second orifice by said radially expanded projection.

11. A tube fitting assembly as set forth in claim 1, wherein the material of said tubing is substantially more ductile than said restraining member.

* * * * *